UNITED STATES PATENT OFFICE.

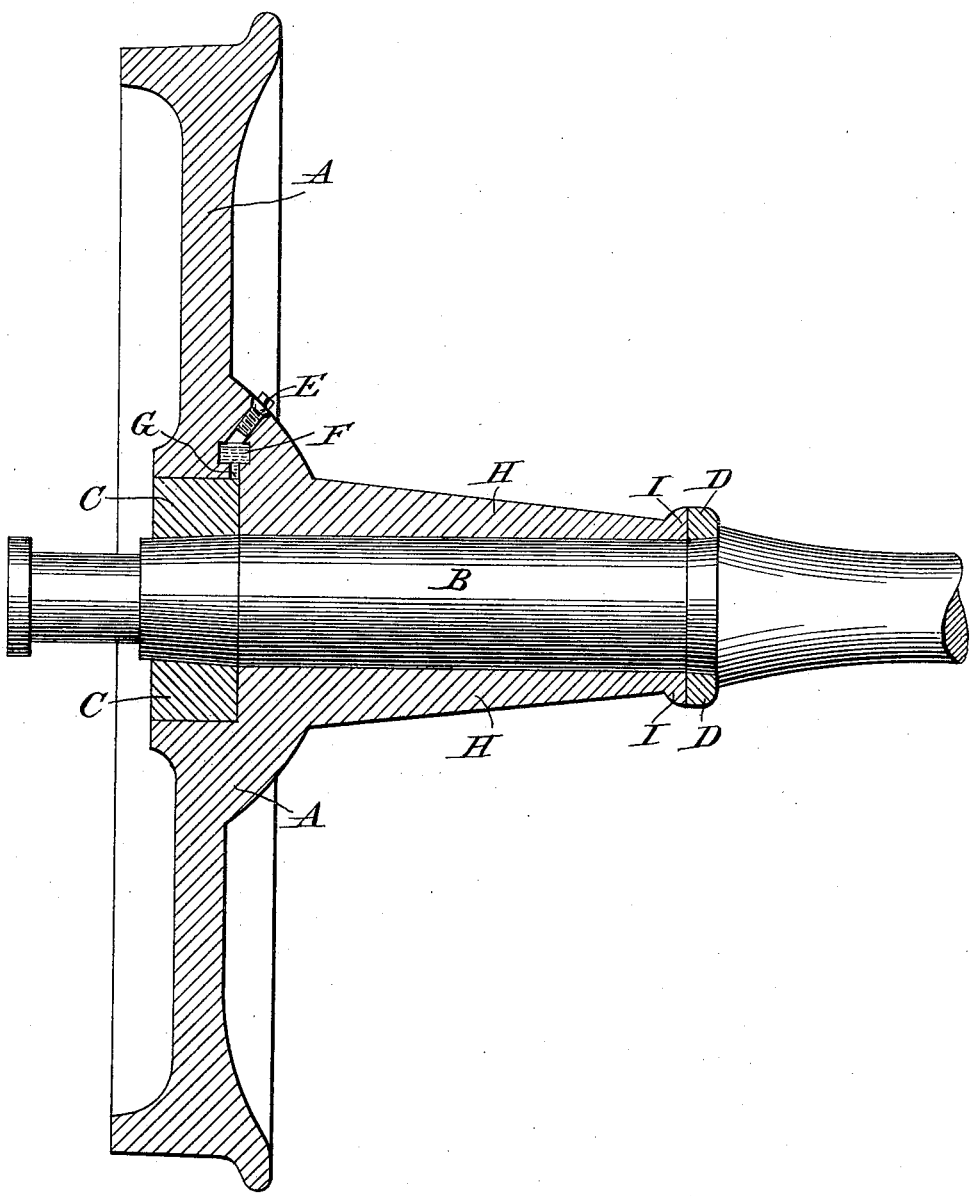

MATT MARKKULA AND AUGUST RANTALA, OF FORT BRAGG, CALIFORNIA.

FREE-RUNNING WHEEL.

No. 810,896.　　　　Specification of Letters Patent.　　　　Patented Jan. 23, 1906.

Application filed June 26, 1905. Serial No. 267,104.

*To all whom it may concern:*

Be it known that we, MATT MARKKULA and AUGUST RANTALA, citizens of the United States, residing at Fort Bragg, in the county of Mendocino and State of California, have jointly invented an Improvement in Free-Running Wheels, of which the following is a specification.

Our invention relates to car-wheels which may revolve on the axle independent of each other. We aim to provide a strong, durable, and cheap wheel which may turn free of the axle. The ability of such a device to save friction on curves is well known.

In the accompanying drawing the figure is a view of one end of the car-axle with the wheel attached.

A is the wheel, with a lengthened hub H.

B is the end of the axle turned to a smooth uniform diameter between the journal and shoulder D, except where a very slight coning is made for retaining-ring C and a place for shoulder D.

E is a screw for closing oil-hole F, and G is an orifice for feeding the oil to the bearings.

I is a flare in the hub and corresponds in face-surface to shoulder D.

Hub H has been bored out to fit axle B. The shoulder at D has been formed by the aid of a ring fitting closely on the axle. A recess has been made in the hub for retaining-ring C.

Wheel A is placed upon the axle. Retaining-ring C, made to fit the place provided for it, is pressed into place on the axle and fits the recess in the hub nicely. Chamber F is filled with oil, and screw E is placed into position. The other end of the axle is of usual construction, and the wheel is pressed onto that in the usual manner.

This construction provides a large bearing-surface at points of greatest pressure, and thereby distributes pressure, so that the danger of parts wearing loose is removed. The hub H and retaining-ring C will be serviceable and safe throughout the entire life of any wheels used at the present time whether chilled, rolled, or steel-rimmed. Retaining-ring C receives greatest pressure and prevents wear of the axle. The generous surface provided between C and D and the amount of pressure prevent the axle from wearing perceptibly at that point. When the wheel is no longer serviceable, it may be removed. If D and C are worn, they may be put away with the wheel and a new wheel with a new shoulder-ring and retaining-ring may be put on. This construction, giving a large surface for friction at points of greatest upward pressure and a smaller-diametered lengthened surface away from the points of greatest pressure, and this construction also providing large surfaces for friction from lateral motion, gives a wheel of very great stability and durability at the hub.

We are aware that devices much similar to ours and devices where retaining-collars and long hubs have been used have been invented. We therefore do not claim the invention, broadly; but What we do claim as our invention is—

1. The improvement in wheels free to turn on their axles, consisting of a flanged friction-face at the end of a lengthened hub; of a reciprocal friction-face against which the flanged face bears, the reciprocal friction-face being on a shoulder on the axle; of an internal friction-face on the hub which bears against the friction-face of a retaining-ring having on it a journal-bearing for part of the hub of a free-turning wheel; and of a two-part auxiliary journal for the hub of a free-turning wheel, one of the parts of said auxiliary journal being the back of a retaining-ring lying within the hub of a free-turning wheel and being secured to the axle, and the other part of the auxiliary journal being that part of the axle which lies between the retaining-ring and the shoulder on the axle provided with the reciprocal friction-face, in combination with a wheel pressed on the other end of the axle in the usual manner as herein specified.

2. The combination with a car-axle provided with bearings at its ends, of a two-part auxiliary journal for the hub formed of the back of the retaining-ring and of that part of the axle which lies between the retaining-ring C and the shoulder D, said retaining-ring being securely fastened to the axle and acting with the shoulder D in holding the flanged friction-face on the hub in contact with the reciprocal face on the shoulder D, and the internal friction-face of the hub in contact with the friction-face on the retaining-ring C, thereby keeping the free-turning wheel in its position on the axle, substantially as herein described.

MATT MARKKULA.
　　　　　　　　　　AUGUST RANTALA.

Witnesses:
　　EDWARD LANTO,
　　G. E. BARGQVIST.